(12) United States Patent
Tan et al.

(10) Patent No.: US 11,293,572 B2
(45) Date of Patent: Apr. 5, 2022

(54) SYSTEM FOR CONNECTING AND SEALING FLEXIBLE AND RIGID PIPES UNDER HIGH PRESSURE

(71) Applicant: SHANGHAI ZHONGYUAN FUEL RAIL MANUFACTURE CO., LTD, Shanghai (CN)

(72) Inventors: Shili Tan, Shanghai (CN); Chunhong Lu, Shanghai (CN); Xiaowei Song, Shanghai (CN)

(73) Assignee: SHANGHAI ZHONGYUAN FUEL. RAIL MANUFACTURE CO., LTD, Shanghai (CN)

(*) Notice: Subject to any disclaimer, the term of this patent is extended or adjusted under 35 U.S.C. 154(b) by 229 days.

(21) Appl. No.: 16/691,206

(22) Filed: Nov. 21, 2019

(65) Prior Publication Data

US 2020/0240561 A1    Jul. 30, 2020

Related U.S. Application Data

(63) Continuation of application No. PCT/CN2019/077740, filed on Mar. 12, 2019.

(30) Foreign Application Priority Data

Jan. 30, 2019  (CN) .......................... 201910093331.7

(51) Int. Cl.
*F16L 33/26* (2006.01)
*F16L 33/01* (2006.01)

(52) U.S. Cl.
CPC ............... *F16L 33/26* (2013.01); *F16L 33/01* (2013.01)

(58) Field of Classification Search
CPC ....... F16L 33/01; F16L 33/26; F16L 33/2076; F16L 11/11; F16L 47/24

(Continued)

(56) References Cited

U.S. PATENT DOCUMENTS 4,288,110 A * 9/1981 Grenell .................... F16L 33/26
5,413,147 A * 5/1995 Moreiras ............. F16L 33/2076

(Continued)

FOREIGN PATENT DOCUMENTS

CN       1719088 A      1/2006
CN      201982826 U     9/2011

(Continued)

OTHER PUBLICATIONS

International Search Report (in English and Chinese) and Written Opinion in PCT/CN2019/077740, dated Oct. 30, 2019, 9 pages provided.

*Primary Examiner* — Zachary T Dragicevich
(74) *Attorney, Agent, or Firm* — Hamre, Schumann, Mueller & Larson, P.C.

(57) ABSTRACT

A system for connecting and sealing flexible and rigid pipes under high pressure comprises a flexible pipe, rigid pipes, and transition connectors, wherein two ends of each transition connector are respectively connected with the flexible pipe and one rigid pipe, external sides of the flexible pipe and the transition connectors are coated with a rubber layer, buckling sleeves are buckled on the rubber layer outside the transition connectors, aluminum alloy connectors are embedded into external surfaces, extending out of the rubber layer, of the transition connectors, and external buckling sleeves are buckled on external surfaces of the aluminum alloy connectors.

19 Claims, 4 Drawing Sheets

(58) Field of Classification Search
USPC .......................................... 285/222.1–222.4
See application file for complete search history.

(56) References Cited

U.S. PATENT DOCUMENTS

| | | | |
|---|---|---|---|
| 6,354,332 B1* | 3/2002 | Burkhardt | ............... F16L 33/01 |
| 7,114,526 B2* | 10/2006 | Takagi | |
| 8,919,173 B2* | 12/2014 | Hibino | |
| 9,255,657 B2 | 2/2016 | Koshino et al. | |
| 2004/0094953 A1* | 5/2004 | Luft | ................... F16L 33/2076 |
| 2004/0119283 A1* | 6/2004 | Furuta | ................. F16L 33/2076 |

FOREIGN PATENT DOCUMENTS

| | | |
|---|---|---|
| CN | 202484493 U | 10/2012 |
| CN | 102478139 B | 12/2014 |
| CN | 107956942 A | 4/2018 |
| CN | 108916498 A | 11/2018 |
| DE | 102005028689 A1 | 2/2006 |

\* cited by examiner

SYSTEM FOR CONNECTING AND SEALING FLEXIBLE AND RIGID PIPES UNDER HIGH PRESSURE

BACKGROUND OF THE INVENTION

1. Technical Field

The invention relates to a connection mechanism, in particular to a system for connecting and sealing flexible and rigid pipes under high pressure.

2. Description of Related Art

With the increasing demand of consumers for comfort experience and the increasing attention of the state to environmental protection, new energy electric transportation has become a trend. New energy electric vehicles play a key role in improving the requirement of endurance mileage, the popularization of urban electric traffic, the extension of battery life, the improvement of endurance and the performance of driving system.

At present, the application of heat pump air-conditioners is an effective solution to heating of battery electric vehicles, is one of few feasible technologies to guarantee low-energy heating in the absence of a breakthrough of power batteries due to the fact that the heat pump air-conditioners have an energy coefficient much higher than PTC and can effectively increase the endurance mileage.

The refrigerant adopted by traditional air conditioners is R134a, and an air-conditioning system has a high pressure and a lower pressure according to working conditions, wherein the high pressure is about 13 bar, and the lower pressure is 1 bar-3 bar. Thus, R134a is only a transitional substitute to environment-friendly products and will be completely eliminated sooner or later The refrigerant adopted by the heat pump air-conditioners is R744 ($CO_2$), namely a carbon dioxide refrigerant, so that the working pressure of a high-pressure pipe is 170 bar, and the maximum pressure in the pipe under ultimate high-temperature climate can reach 300 bar; and the working pressure of a low-pressure pipe is 130 bar, and the pressure in the low-pressure pipe under ultimate high-temperature climate is also greatly increased. Meanwhile, the working temperature is −40☐ at minimum and is 180☐ at maximum. Thus, flexible pipe assemblies of traditional vehicle air-conditioners cannot withstand an environment temperature from −40☐ to 180☐ and a system pressure from 130 bar to 170 bar (the ultimate pressure is 300 bar). Thus, heating wires have to be adopted to replace the flexible pipe assemblies, which cannot withstand high temperature and high pressure, to be applied to new-energy vehicles, and heating based on a heat pump technology is unavailable for the new-energy vehicles. The endurance mileage of the vehicles will be greatly decreased if the heating wires are adopted for heating. If connection is fulfilled by means of rigid pipes solely, pipe sealing can be realized; however, it is impossible to adopt rigid pipes solely due to the internal space limitation of the vehicles, and it is necessary to adopt a pipe assembly formed by a flexible pipe and a rigid pipe. Thus, the technical issue urgently to be settled currently is to provide an air-conditioning pipe, which is suitable for the carbon dioxide refrigerant and adaptable to high and low temperature alternations and high-pressure working conditions and can undoubtedly guarantees the sealing performance of connectors to adapt to high and low temperature and high-pressure atmospheres.

Chinese Invention Patent Publication No. CN102478139B discloses a pipe connector which comprises a flexible pipe, rigid pipes and casing pipes, wherein each rigid pipe includes an insertion part inserted into the flexible pipe from an end of the flexible pipe, and the casing pipes are outside the insertion parts and the flexible pipe in the radial direction and press the flexible pipe towards the insertion parts. Each insertion part includes a corrugated face on the external surface of the insertion part and a cylindrical face on the external face of the top of the insertion part. Each casing pipe includes a first small-diameter part and a second small-diameter part, wherein the first small-diameter part is arranged outside one corrugated face in the radial direction and presses the flexible pipe towards the corrugated face, and the second small-diameter part is arranged outside one cylindrical face in the radial direction and presses the flexible pipe towards the cylindrical face. The pipe connector fulfills the connection between the flexible pipe and the rigid pipes. However, this pipe connector cannot be used under high pressure and thus cannot be applied to new-energy electrical vehicles.

Chinese patent application CN108916498A discloses a connection structure for an R744 air-conditioning pipe and a switch connection assembly. The connection structure comprises an R744 air-conditioning pipe and a switch connection assembly, wherein the R744 air-conditioning pipe sequentially includes a barrier layer, a first rubber layer, a reinforcing layer, and a second rubber from inside to outside; the switch connection assembly includes a connector, a switch connection pipe, and an external casing pipe; one end of the connector is fixedly connected with one end of the barrier layer; the switch connection pipe is composed of a casing part and a pipe connection part; after the casing part is arranged on the connector and the external casing pipe is arranged on the second rubber layer and the casing part, the external casing pipe is fixed to the second rubber layer and the casing part; and an assembly groove is formed in the peripheral surface of the connector, and a lug boss corresponding to the assembly groove is arranged on the internal circumferential surface of the casing part and is buckled into the assembly groove in a matched manner under a buckling force, so that the casing part and the connector are fixed into a whole. However, due to the fact that the connection structure adopts a sealing ring for sealing, air leakage may be caused under high and low temperature atmospheres during work due to aging of the sealing ring and rubber materials of other parts. Besides, the connection structure is likely to crack in an area where martensite or austenite twins are formed due to deformation of stainless steel materials during buckling, which in turn results in leakage.

BRIEF SUMMARY OF THE INVENTION

The objective of the invention is to overcome the shortcomings of the prior art by providing a system for connecting and sealing flexible and rigid pipes under high pressure. The system has the characteristics of high pressure resistance, high temperature resistance, and vibration resistance, thereby being applied to high-pressure air-conditioning pipes to be used for new-energy electrical vehicles.

The technical solution adopted by the invention to fulfill the above-mentioned objective is as follows:

A system for connecting and sealing flexible and rigid pipes under high pressure comprises a flexible pipe, rigid pipes, transition connectors, and buckling sleeves, wherein:

The wall thickness of each transition connector is 5-20 times that of the flexible pipe, two ends of the transition connector are respectively connected with the flexible pipe and one rigid pipe, external sides of the flexible pipe and the transition connectors are coated with a rubber layer, and the buckling sleeves are buckled on the rubber layer outside the transition connectors.

Preferably, the flexible pipe is a metal corrugated pipe.

More preferably, the metal corrugated pipe is made from stainless steel.

Preferably, during production, the metal corrugated pipe is cut to a specified length first and is then connected with the transition connectors, so that the situation that the buckling positions of the buckling sleeves cannot be positioned on the external sides of the transition connectors because the external sides of the connectors are not coated with a rubber layer if the transition connectors are welded after the metal corrugated pipe is coated with the rubber layer and is cut to is avoided. If the buckling sleeves are buckled on the rubber layer outside the metal corrugated pipe, the corrugated pipe will be deformed in a buckled and stressed area, deformed martensite or austenite twins will be generated in a material structure, and the deformed area of the corrugated pipe may crack under high pressure, which in turn results in leakage.

Preferably, the rubber layer includes an internal rubber layer wrapping the metal corrugated pipe, a reinforcing layer wound to be woven on the internal rubber layer, and an external rubber layer arranged on the reinforcing layer.

Preferably, the flexible pipe is in welded connection or riveted connection with the transition connectors.

In the case of riveted connection, the flexible pipe is squeezed to be in interference riveted connection with the transition connectors.

In the case of welded connection, the flexible pipe is inserted into the transition connectors, and then the flexible pipe and the transition connectors are welded through contact faces; or the flexible pipe and the transition connector are in the welded connection end to end.

More preferably, the metal corrugated pipe is connected with the transition connectors through laser welding, copper brazing, or plasma arc welding.

More preferably, the reinforcing layer used after the metal corrugated pipe is welded on the transition connectors is a high-strength aramid yarn woven layer, a high-strength polyester yarn woven layer, or a metal wire woven layer. Preferably, by adoption of the metal wire woven layer, the strength and bending resilience of the flexible pipe are guaranteed.

More preferably, the metal corrugated pipe is connected with the transition connectors through copper brazing, and the metal corrugated pipe is actually subjected to solution treatment in the process of copper brazing, so that martensite or austenite twins in the metal corrugated pipe are eliminated, and the reinforcing layer used in this case is the high-strength aramid yarn woven layer, the high-strength polyester yarn woven layer, or the metal wire woven layer. Preferably, by adoption of the high-strength aramid yarn woven layer or the high-strength polyester yarn woven layer, the strength of the flexible pipe is guaranteed.

More preferably, the metal wire woven layer is made from brass-clad alloy steel.

Preferably, each transition connector has an external side face provided with parallel annular protrusions, thus having higher axial tensile resistance after being coated with rubber. External end faces of the transition connectors extend out of the rubber layer to be connected with the rigid pipes.

Preferably, the buckling sleeves are connected with the transition connectors in a riveted and buckled manner and each have an internal side face provided with parallel annular toothed protrusions and an end provided with a lug boss. During buckling, the lug bosses of the buckling sleeves are riveted and clamped in grooves in the ends of the transition connectors, and the annular toothed protrusions are clamped in the rubber on the external sides of the transition connectors, so that the axial tensile resistance of the transition connectors is greatly improved.

Preferably, the rigid pipes are made from stainless steel or aluminum alloy and are in welded connection or interference riveted connection with the transition connectors.

More preferably, the rigid pipes are connected with the transition connectors through laser welding, copper brazing, plasma arc welding, argon arc welding, or induction welding.

Preferably, aluminum alloy connectors are embedded into the external surfaces, extending out of the rubber layer, of the transition connectors and are in interference fit connection with the transition connectors, and annular toothed protrusions are arranged on the external surface of each transition connector, so that the aluminum alloy connectors have higher axial tensile resistance when buckled and connected and improve the high-pressure resistance and sealing performance.

More preferably, copper rings are arranged between the external surfaces of the transition connectors and internal side faces of the aluminum alloy connectors to fulfill a better sealing effect between the transition connectors and the aluminum alloy connectors.

External buckling sleeves are buckled on the external surfaces of the aluminum alloy connectors, and the external surfaces of the external buckling sleeve are of protruding annular toothed structure and can be clamped in the aluminum alloy connectors during buckling, so that the axial tensile resistance is greatly improved, and the high-pressure resistance and the sealing performance are improved. Positioning grooves are formed in the aluminum alloy connectors, and the external buckling sleeves can be conveniently buckled in the positioning grooves, so that the axial positions of the external buckling sleeves are fixed.

When the aluminum alloy connectors are arranged, external end faces of the aluminum alloy connectors are in welded connection with rigid aluminum alloy pipes, and the buckling sleeves and the rigid pipes are made from the same materials, so that the possibility of leakage caused by deformation of connected ends due to environmental changes at a high or low temperature, or under a high pressure is lowered. Thus, the system can be used in the field of new-energy vehicles more conveniently.

The flexible pipe formed by the metal corrugated pipe cannot be stressed in the axial direction, and the buckling sleeves are buckled on a rubber pipe of the traditional structure, and consequentially, the internal corrugated pipe is radially stressed and can be deformed, and deformed martensite or austenite twins are generated in the material structure, as a result, the material strength is reduced, and the pressure resistance of a product is affected. According to the invention, after the metal corrugated pipe is in welded connection with the transition connectors, the buckling positions are located on rubber outside the transition connectors, so that the internal corrugated pipe is prevented from being radially stressed when the rubber pipe is buckled, and will not be deformed, and deformed martensite or austenite twins in the structure are avoided. Thus, the pressure resistance between the flexible pipe and the rigid pipes is greatly improved, and the system can be used under actual working conditions of high-low temperature changes, high pressures, and high-intensity impact, thereby being used for air-conditioning pipes of the new-energy vehicles. By adoption of the connection system of the invention, the pressure resistance is greatly improved, heat pumps can be applied to the new-energy vehicles to be used for heating, and thus, the endurance mileage is remarkably increased.

Compared with the prior art, the invention has the following advantages:

1. The transition connectors are additionally configured, and are coated with the rubber after being in welded connection with the corrugated pipe, so that the axial tensile resistance of the flexible pipes and the rigid pipes is improved.

2. The buckled and stressed positions are located on the rubber outside the transition connectors, so that the corrugated pipe is prevented from being stressed, and an internal metal layer of the flexible pipe has higher strength.

3. The lug bosses at the ends of the buckling sleeves are riveted and clamped in the grooves in the ends of the transition connectors, and the parallel annular toothed protrusions are arranged on the internal side faces of the buckling sleeves and are clamped in the rubber on the external sides of the connectors, so that the axial tensile resistance of the flexible pipe and the rigid pipes is improved.

Reference Signs: 1, metal corrugated pipe; 2, transition connector; 3, rubber layer; 4, buckling sleeve; 5, rigid pipe; 6, aluminum alloy connector; 7, external buckling sleeve; 8, positioning groove; 9, copper ring.

DETAILED DESCRIPTION OF THE INVENTION

The invention is expounded as follows in combination of specific embodiments. With reference to the following embodiments, those skilled in the art can have a better understanding of the invention. However, these embodiments are not intended to limit the invention in any form. It should be noted that those ordinarily skilled in the art are permitted to make various deformations and improvements without deviating from the concept of the invention, and all these deformations and improvements should also fall within the protection scope of the invention.

Figure 5:
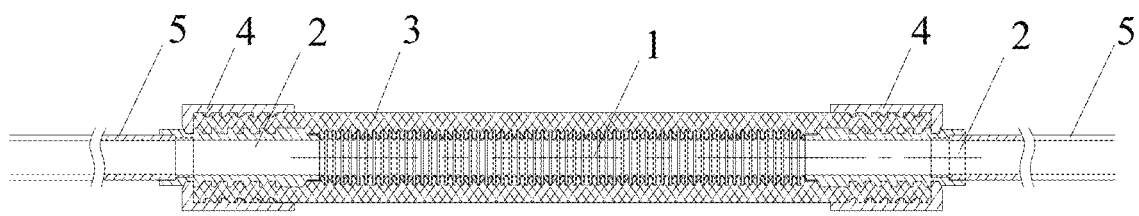
FIG. 5 is a structural view after the transition connectors are connected with rigid pipes.

As shown in FIG. 5, the system for connecting and sealing flexible and rigid pipes under high pressure structurally comprises a flexible pipe and transition connectors 2, wherein the flexible pipe is formed by a metal corrugated pipe 1 coated with a rubber layer 3; the transition connectors 2 are connected with the metal corrugated pipe 1, the wall thickness of each transition connector 2 is greater than that of the flexible pipe and is 5-20 times that of the metal corrugated pipe 1, and the external sides of the transition connectors 2 are also coated with the rubber layer 3; buckling sleeves 4 are buckled on the rubber layer 3 outside the transition connectors 2; and external ends of the transition connectors 2 are connected with rigid pipes 5.

Figure 1:
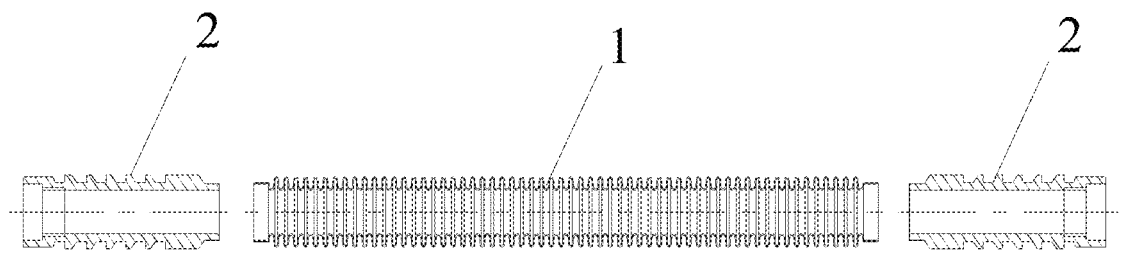
FIG. 1 is a structural view before connection of a metal corrugated pipe and transition connectors.
Figure 2:
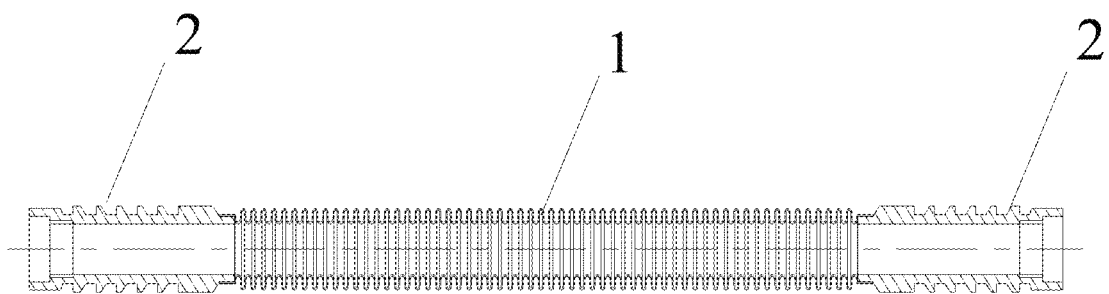
FIG. 2 is a structural view after connection of the metal corrugated pipe and the transition connectors.
Figure 3:
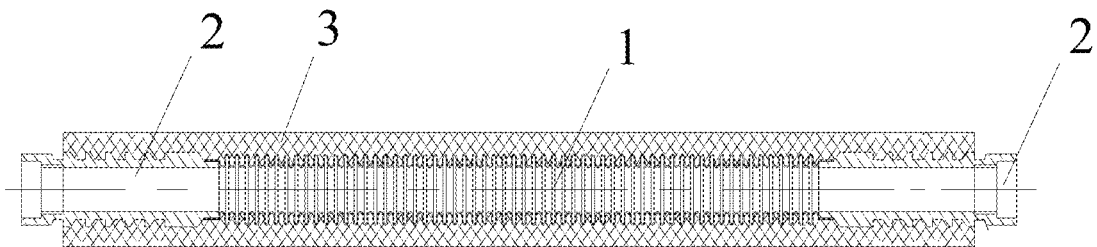
FIG. 3 is a structural view after the metal corrugated pipe and the transition connectors are coated with rubber.

In the above-mentioned system, the metal corrugated pipe 1 is made from stainless steel, and the specification of the metal corrugated pipe 1 is determined according to an application system, for instance, metal corrugated pipes having different lengths and internal diameters are selected to be used as the flexible pipe according to system requirements. Both ends of the metal corrugated pipe 1 are connected with the transition connectors 2, and the structure obtained before connection is shown in FIG. 1. During connection, the metal corrugated pipe 1 and the transition connectors 2 are connected first, as shown in FIG. 2; and then external sides of the metal corrugated pipe 1 and the transition connectors 2 are coated with the rubber layer 3, as shown in FIG. 3. Besides, during production, the metal corrugated pipe 1 is cut to a specified length at first and then is connected with the transition connectors 2, so that the situation that the buckling positions of the buckling sleeves cannot be positioned on the external sides of the transition connectors because the external sides of the connectors are not coated with a rubber layer if the transition connectors are welded after the metal corrugated pipe is coated with the rubber layer and is cut is avoided. If the buckling sleeves are buckled on the rubber layer outside the stainless steel corrugated pipe, the corrugated pipe in a buckling stress area will be deformed, deformed martensite or austenite twins will be formed in the material structure, and the deformed area of the corrugated pipe may crack under high pressure, which in turn results in leakage.

The rubber layer 3 used for rubber coating includes an internal rubber layer wrapping the metal corrugated pipe 1, a reinforcing layer wound and woven on the internal rubber layer, and an external rubber layer arranged on the reinforcing layer, wherein the reinforcing layer is selected according to different connection manners of the metal corrugated pipe 1 and the transition connectors 2. The metal corrugated pipe 1 is in welded connection with the transition connectors 2. Furthermore, the metal corrugated pipe 1 is connected with the transition connectors 2 through laser welding, copper brazing, or plasma arc welding in the case of welded connection; and particularly, the metal corrugated pipe is inserted into the transition connectors and are then welded on the transition connectors, or end faces of the stainless steel corrugated pipe are in welded connection with end faces of the transition connectors.

The reinforcing layer is needed for rubber coating after the metal corrugated pipe is welded on the transition connectors in different manners and is a high-strength aramid yarn woven layer, a high-strength polyester yarn woven layer, or a metal wire woven layer; and metal wires are made from brass-clad alloy steel, so that the strength and bending resilience of the flexible pipe are guaranteed.

In this system, the transition connectors 2 are of hollow tubular structures and have internal diameters the same as the internal diameter of the metal corrugated pipe connected with the transition connectors and the internal diameters of the rigid pipes; each transition connector 2 has an external side face provided with parallel annular toothed protrusions, thus having higher axial tensile strength after being coated with rubber; and external end faces of the transition connectors 2 extend out of the rubber layer to be connected with the rigid pipes.

Figure 4:
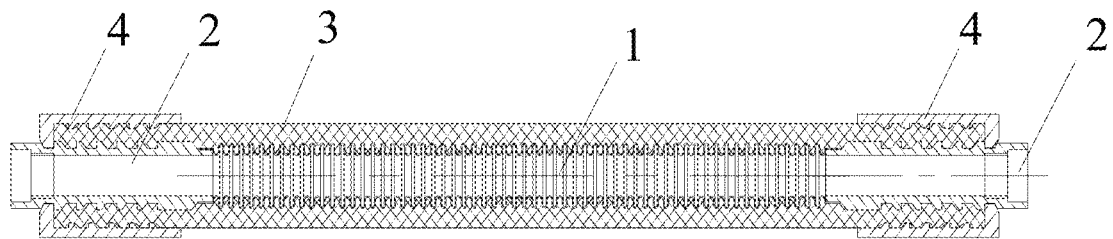
FIG. 4 is a structural view after buckling sleeves are buckled on the transition connectors.

After the rubber coating is finished, the buckling sleeves 4 are buckled outside the rubber layer located outside the transition connectors 2, as shown in FIG. 4. The buckling sleeves 4 each have an internal side face provided with parallel annular toothed protrusions and an end provided with a lug boss. During buckling, the lug bosses of the buckling sleeves are riveted and clamped in grooves in the ends of the transition connectors, and the annular toothed protrusions are clamped in the rubber outside the transition connectors. The buckling positions of the buckling sleeves 4 are positioned on the transition connectors, so that the buckling sleeves are prevented from being directly buckled on the external sides of the metal corrugated pipe, the internal metal corrugated pipe will not be radially stressed, and the pressure resistance of the flexible pipe will not be reduced; and meanwhile, the axial tensile strength of the flexible pipe is further improved.

In this system, the rigid pipes 5 are made from stainless steel, aluminum alloy, or other materials which are selected as actually needed. The rigid pipes 5 are in welded connection with the external ends of the transition connectors 2, and the rigid pipes 5 are connected with the external ends of the transition connectors 2 through laser welding, plasma arc welding, or the like in the case of welded connection.

When the rigid pipes are made from aluminum alloy, aluminum alloy connectors are embedded into the external surfaces, extending out of the rubber layer, of the transition connectors and are in interference fit connection with the transition connectors, and annular toothed protrusions are arranged on the external surfaces of the transition connectors to make sure that the aluminum alloy connectors have higher axial tensile resistance when buckled and connected. In order to improve the sealing performance, copper rings are arranged between the external surfaces of the transition connectors and the internal side faces of the aluminum alloy connectors to fulfill a better sealing effect between the transition connectors and the aluminum alloy connectors.

External buckling sleeves are buckled on the external surfaces of the aluminum alloy connectors, and the internal surfaces of the external buckling sleeves are of protruding annular toothed structures and are clamped in the aluminum alloy connectors during buckling protruding, so that the axial tensile resistance is greatly improved. Positioning grooves are formed in the aluminum alloy connectors, and the external buckling sleeves can be conveniently buckled in the positioning grooves, so that the axial positions of the external buckling sleeves are fixed. When the aluminum alloy connectors are arranged, external end faces of the aluminum alloy connectors are in welded connection with rigid aluminum alloy pipes, and the buckling sleeves and the rigid pipes are made from the same materials, so that the possibility of leakage caused by inconsistent deformation of the connected ends under actual high-temperature, low-temperature, or high-pressure working conditions is further lowered. Thus, the system can be used in the field of new-energy vehicles more conveniently.

By means of special treatment on the assemblies and selection of the connection manners of the assemblies, the system can greatly improve the pressure resistance and sealing performance of the flexible pipe and the rigid pipes and thus can be used under high pressure, thereby being applied to air-conditioning pipes of new-energy vehicles.

The technical solutions and technical effects of the invention are further explained in combination with the following more detailed embodiments.

Embodiment 1

A system for connecting and sealing flexible and rigid air-conditioning pipes under high pressure comprises a rubber pipe and transition connectors, wherein the rubber pipe comprises a metal corrugated pipe serving as an inner layer, the transition connectors are connected with the metal corrugated pipe, the external sides of the transition connectors are coated with a rubber layer, buckling sleeves are buckled on the rubber layer outside the transition connectors, and external ends of the transition connectors are connected with rigid pipes.

Figure 8:
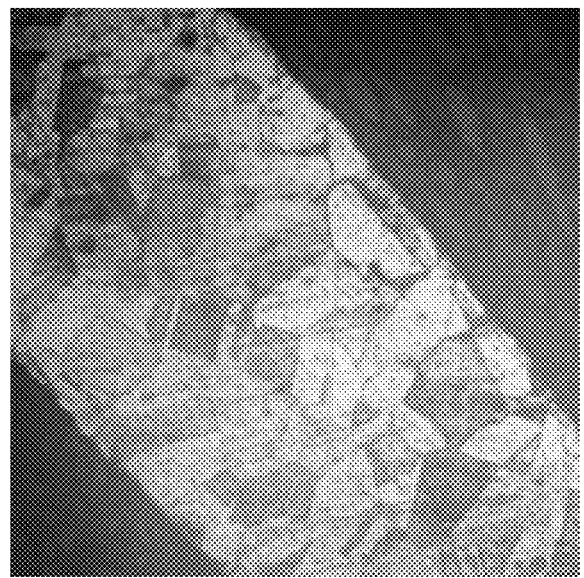
FIG. 8 is an SEM photo of the metal corrugated pipe generating austenite twins due to deformation.

In the above-mentioned system, the metal corrugated pipe is made from stainless steel, and both ends of the metal corrugated pipe are connected with the transition connectors. During connection, the metal corrugated pipe and the transition connectors are connected first, and then external sides of the metal corrugated pipe and the transition connectors are coated with the rubber layer. Besides, during production, the metal corrugated pipe is cut to a specified length at first and then is connected with the transition connectors, so that the situation that the buckling positions of the buckling sleeves cannot be positioned on the external sides of the transition connectors because the external sides of the connectors are not coated with a rubber layer if the transition connectors are welded after the metal corrugated pipe is coated with the rubber layer and is cut is avoided. In the prior art, the buckling sleeves are buckled on the rubber layer outside the stainless steel corrugated pipe which generally has a small wall thickness of 0.2 mm, and consequentially, the corrugated pipe in a buckled and stressed area will be deformed after being buckled and stressed, deformed martensite or austenite twins will be formed in a material structure, as shown in FIG. 8, and the deformed area of the corrugated pipe may crack under high pressure, which in turn results in leakage. If a metal corrugated pipe with a large wall thickness is adopted, the metal corrugated pipe cannot be used as a flexible pipe anymore due its high rigidity, which means that this problem cannot be solved through thickness increase of the metal corrugated pipe.

Figure 9:
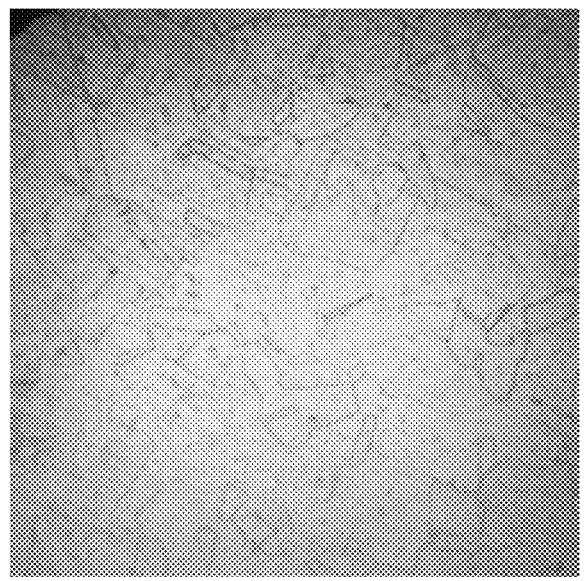
FIG. 9 is an SEM photo of the metal corrugated pipe without deformation and austenite twins in Embodiment 1.

However, through the above process step adopted in this application, the wall thickness of each transition connectors is greater than that of the metal corrugated pipe. Particularly, in this embodiment, the wall thickness of each transition connector is 5 times that of the metal corrugated pipe, so that the transition connectors can withstand the buckling stress, and deformed martensite or austenite twins will not be generated on the transition connectors. A corresponding SEM photo is as shown in FIG. 9.

The rubber layer used for rubber coating includes an internal rubber layer wrapping the metal corrugated pipe, a reinforcing layer wound and woven on the internal rubber layer, and an external rubber layer arranged on the reinforcing layer, wherein the reinforcing layer is an aramid yarn woven layer, so that the strength and bending resilience of the flexible pipe are guaranteed.

The transition connectors have external side faces provided with parallel annular toothed protrusions and external end faces extend out of the rubber layer to be connected with the rigid pipes. After rubber coating and vulcanization are finished, the buckling sleeves are buckled on the rubber layer outside the transition connectors. The buckling sleeves each have an internal side face provided with parallel annular toothed protrusions and an end provided with a lug boss. During buckling, the lug bosses of the buckling sleeves are riveted and clamped in grooves in the ends of the transition connectors, and the annular toothed protrusions are clamped in rubber outside the transition connectors. The buckling positions of the buckling sleeves 4 are positioned on the transition connectors, so that the buckling sleeves are prevented from being directly buckled on the external side of the metal corrugated pipe, the internal metal corrugated pipe will not be radially stressed, and the pressure resistance of the flexible pipe will not be reduced; and meanwhile, the axial tensile resistance of the flexible pipe is further improved.

In this system, the rigid pipes are made from stainless steel and are connected to the external ends of the transition connectors through laser welding.

The sealing performance of the system for connecting and sealing flexible and rigid air-conditioning pipes under high pressure in this embodiment is tested. According to test results, the system can still be used without leakage when the burst pressure reaches 780 bar, and compared with existing common flexible air-conditioning pipes capable of withstanding a burst pressure of only about 100 bar in the prior art, the working pressure of this application is increased by one magnitude. The burst pressure of existing R744 air-conditioning pipes is 340 bar as required by the technical requirements. The actual test value of the burst pressure of the invention is twice that of the existing R744 air-conditioning pipes. Thus, the system can be used for air-conditioning pipes of new-energy vehicles. The system can withstand a high pressure and thus can be heated by a heat pump, thereby preventing endurance mileage reduction of electrical vehicles caused by excessive power consumption of heating wires.

Embodiment 2

The system for connecting and sealing flexible and rigid air-conditioning pipes under high pressure comprises a flexible pipe and transition connectors, wherein the flexible pipe is formed by a metal corrugated pipe coated with a rubber layer; the transition connectors are connected with the metal corrugated pipe, the wall thickness of each transition connector is 20 times that of the metal corrugated pipe, and the external sides of the transition connectors are also coated with the rubber layer; the buckling sleeves are buckled on the rubber layer outside the transition connectors; and external ends of the transition connectors are connected with rigid pipes.

In the above-mentioned system, the metal corrugated pipe has a wall thickness of 0.2 mm and is made from stainless steel, and both ends of the metal corrugated pipe are connected with the transition connectors. During connection, the metal corrugated pipe and the transition connectors are connected first, and then external sides of the metal corrugated pipe and the transition connectors are coated with the rubber layer. Besides, during production, the metal corrugated pipe is cut to a specified length and is then connected with the transition connectors, so that the situation that the performance of the meal corrugated pipe is affected by new deformed martensite or austenite twins generated if the transition connectors are welded after the metal corrugated pipe is coated with the rubber layer and is cut, and that the metal corrugated pipe is likely to be deformed under high pressure, which in turn causes poor air-tightness and failure to use under high pressure is avoided.

During rubber coating, the rubber layer includes an internal rubber layer wrapping the metal corrugated pipe, a reinforcing layer wound and woven on the internal rubber layer, and an external rubber layer arranged on the reinforcing layer, wherein the reinforcing layer is selected according to different connection manners of the metal corrugated pipe and the transition connectors. In this embodiment, the metal corrugated pipe is connected with the transition connectors through copper brazing, so that martensite or austenite twins in the metal corrugated pipe are eliminated; and in this case, the reinforcing layer used is a metal wire woven layer, so that the strength of the flexible pipe is guaranteed.

The transition connectors have external side faces provided with parallel annular protrusions and have external end faces extending out of the rubber layer to be connected with the rigid pipes. After rubber coating is finished, the buckling sleeves are buckled on the rubber layer outside the transition connectors. The buckling sleeves each have an internal side face provided with parallel annular toothed protrusions and an end provided with a lug boss. During buckling, the lug bosses of the buckling sleeves are riveted and clamped in grooves in the ends of the transition connectors, and the annular toothed protrusions are clamped in rubber outside the transition connectors. The buckling positions of the buckling sleeves are positioned on the transition connectors, so that the buckling sleeves are prevented from being directly buckled outside the metal corrugated pipe, and the internal metal corrugated pipe will not be radially stressed, the pressure resistance of the flexible pipe will not be reduced; and meanwhile, the axial tensile resistance of the flexible pipe is further improved.

In this system, the rigid pipes are made from stainless steel and are connected to the external ends of the transition connectors through laser welding or argon arc welding, plasma arc welding, induction welding, or the like.

Embodiment 3

The system for connecting and sealing flexible and rigid air-conditioning pipes under high pressure in this embodiment is approximately the same as the system of Embodiment 1 in structure and differs from the system of Embodiment 1 in that a polyester yarn woven layer is arranged in the rubber layer to improve the resilience of the flexible pipe.

Embodiment 4

Figure 6:
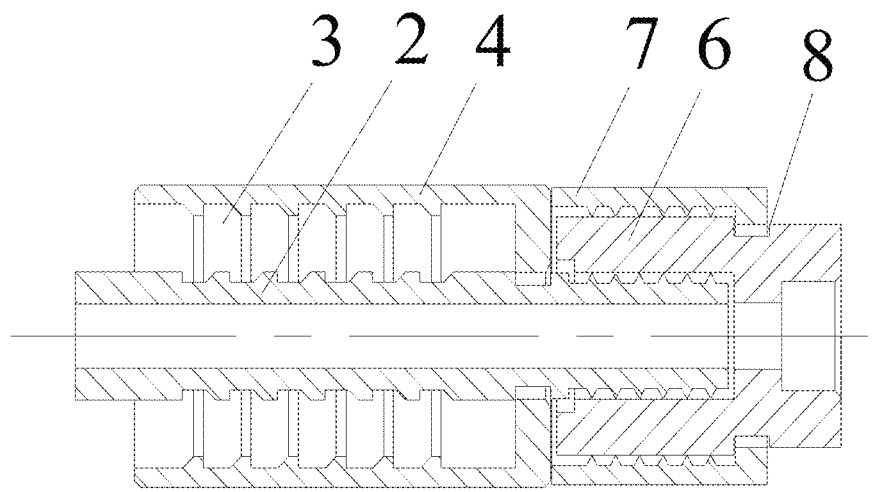
FIG. 6 is a structural view of the transition connector connected with an aluminum alloy connector in Embodiment 4.

Approximately the same as the system of Embodiment 1 in structure, the system for connecting and sealing flexible and rigid air-conditioning pipes under high pressure in this embodiment comprises a flexible pipe and transition connectors, wherein the flexible pipe is formed by a metal corrugated pipe which is coated with a rubber layer and has a wall thickness of 0.2 mm; the transition connectors are connected with the metal corrugated pipe, the wall thickness of each transition connector is 10 times that of the metal corrugated pipe, and the external sides of the transition connectors 2 are also coated with the rubber layer 3; buckling sleeves 4 are buckled on the rubber layer 3 outside the transition connectors 2; and external ends of the transition connectors 2 are connected with rigid pipes 5. In this embodiment, the rigid pipes 5 are made from aluminum alloy, aluminum alloy connectors 6 are embedded into the external surfaces, extending out of the rubber layer, of the transition connectors and are in interference fit connection with the transition connectors 2; annular toothed protrusions are arranged on the external surface of each transition connector 2, so that the aluminum alloy connectors 6 have higher axial tensile resistance when buckled and connected; external buckling sleeves 7 are buckled on the external surfaces of the aluminum alloy connectors 6, and the internal surfaces of the external buckling sleeves 7 are of protruding annular toothed structures and can be clamped in the aluminum alloy connectors 6 during buckling, so that the axial tensile resistance is greatly improved; and positioning grooves 8 are formed in the aluminum alloy connectors, and the external buckling sleeves 7 can be buckled in the positioning grooves 8 conveniently, so that the axial positions of the external buckling sleeves are fixed, as shown in FIG. 6. The aluminum alloy connectors can be conveniently connected with rigid aluminum alloy pipes, and the buckling sleeves and the rigid pipes are made from the same materials, so that the possibility of leakage caused by deformation of connected ends under actual high-temperature, low-temperature, or high-pressure working conditions is further lowered. Thus, the system can be used in the field of new-energy vehicles more conveniently.

Embodiment 5

Figure 7:
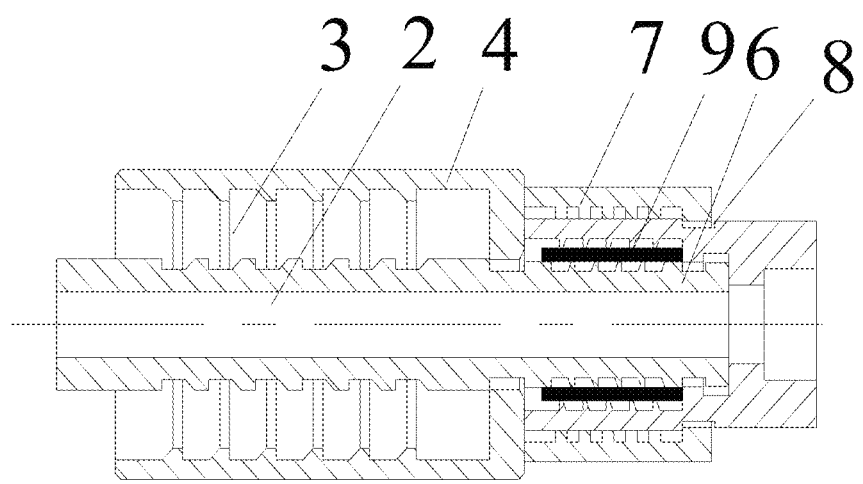
FIG. 7 is a structural view of the transition connector connected with the aluminum alloy connector in Embodiment 5.

The system for connecting and sealing flexible and rigid air-conditioning pipes under high pressure in this embodiment is approximately the same as the system of Embodiment 4 in structure and differs from the system of Embodiment 4 in that copper rings 9 are arranged between the external surfaces of the transition connectors and the internal sides of the aluminum alloy connectors to improve the sealing performance, as shown in FIG. 7. By adoption of the copper rings 9, a better sealing effect between the transition connectors 2 and the aluminum alloy connectors 6 is realized.

With reference to the description of the above embodiments, those ordinarily skilled in the art can understand and use the invention. Clearly, those skilled in the art can easily make various modifications on these embodiments and apply the general principle of this specification to other embodiments without creative work. Thus, the invention is not limited to these embodiments, and all improvements and modifications made by those skilled in the art according to the above disclosure of the invention without deviating from the scope of the invention should also fall within the protection scope of the invention.

What is claimed is:

1. A system for connecting and sealing flexible and rigid pipes under high pressure, comprising a flexible pipe and rigid pipes, wherein:
    the system further comprises transition connectors having a wall thickness 5-20 times that of the flexible pipe;
    two ends of each said transition connector are respectively connected with the flexible pipe and one said rigid pipe, and external sides of the flexible pipe and the transition connectors are coated with a rubber layer;
    buckling sleeves are buckled on the rubber layer outside the transition connectors;
    aluminum alloy connectors are embedded into external surfaces, extending out of the rubber layer, of the transition connectors; and
    external buckling sleeves are buckled on external surfaces of the aluminum alloy connectors.

2. The system for connecting and sealing flexible and rigid pipes under high pressure according to claim 1, wherein the flexible pipe is a metal corrugated pipe.

3. The system for connecting and sealing flexible and rigid pipes under high pressure according to claim 2, wherein the metal corrugated pipe serving as the flexible pipe is made from stainless steel.

4. The system for connecting and sealing flexible and rigid pipes under high pressure according to claim 1, wherein the flexible pipe is cut to a specified length and is then connected with the transition connectors.

5. The system for connecting and sealing flexible and rigid pipes under high pressure according to claim 1, wherein the flexible pipe is in welded connection with the transition connectors.

6. The system for connecting and sealing flexible and rigid pipes under high pressure according to claim 5, wherein the flexible pipe is inserted between rear faces of the transition connectors to be in welded connection with the transition connectors.

7. The system for connecting and sealing flexible and rigid pipes under high pressure according to claim 5, wherein the flexible pipe is in welded connection with the transition connectors through contact faces.

8. The system for connecting and sealing flexible and rigid pipes under high pressure according to claim 1, wherein the flexible pipe is connected with the transition connectors through laser welding, copper brazing, or plasma arc welding.

9. The system for connecting and sealing flexible and rigid pipes under high pressure according to claim 8, wherein the flexible pipe is connected with the transition connectors through laser welding, and the reinforcing layer is an aramid yarn woven layer, a polyester woven layer, or a metal wire woven layer.

10. The system for connecting and sealing flexible and rigid pipes under high pressure according to claim 8, wherein the flexible pipe is connected with the transition connector through copper brazing, and the reinforcing layer is an aramid yarn woven layer, a polyester woven layer, or a metal wire woven layer.

11. The system for connecting and sealing flexible and rigid pipes under high pressure according to claim 8,
    wherein the flexible pipe is connected with the transition connectors through laser welding, and the reinforcing layer is a metal wire woven layer that is made from brass-clad alloy steel.

12. The system for connecting and sealing flexible and rigid pipes under high pressure according to claim 1, wherein each said transition connector is made from stainless steel.

13. The system for connecting and sealing flexible and rigid pipes under high pressure according to claim 1, wherein external end faces of the transition connectors extend out of the rubber layer to be connected with the rigid pipes.

14. The system for connecting and sealing flexible and rigid pipes under high pressure according to claim 1, wherein the rigid pipes are in welded connection with the transition connectors.

15. The system for connecting and sealing flexible and rigid pipes under high pressure according to claim 1, wherein the rigid pipes are connected with the transition connectors through laser welding, copper brazing, plasma arc welding, argon arc welding, or induction welding.

16. The system for connecting and sealing flexible and rigid pipes under high pressure according to claim 1, wherein the rigid pipes are made from stainless steel.

17. The system for connecting and sealing flexible and rigid pipes under high pressure according to claim 1, wherein copper rings are arranged between the external surfaces of the transition connectors and internal side faces of the aluminum alloy connectors.

18. The system for connecting and sealing flexible and rigid pipes under high pressure according to claim 1, wherein external end faces of the aluminum alloy connectors are connected with the rigid pipes that are made from aluminum alloy.

19. The system for connecting and sealing flexible and rigid pipes under high pressure according to claim 1, wherein the aluminum alloy connectors are in welded connection with the rigid pipes that are made from aluminum alloy.

\* \* \* \* \*